United States Patent
Satoya et al.

(10) Patent No.: US 12,455,046 B2
(45) Date of Patent: Oct. 28, 2025

(54) GAS SUPPLY SYSTEM FOR FILLING HYDROGEN INTO TANK

(71) Applicant: TOYOTA JIDOSHA KABUSHIKI KAISHA, Toyota (JP)

(72) Inventors: Daisuke Satoya, Nisshin (JP); Hiroki Yahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/492,062

(22) Filed: Oct. 23, 2023

(65) Prior Publication Data

US 2024/0209987 A1   Jun. 27, 2024

(30) Foreign Application Priority Data

Dec. 22, 2022   (JP) .................................. 2022-205357

(51) Int. Cl.
*F17C 5/06* (2006.01)
*F17C 7/00* (2006.01)
*H01M 8/04082* (2016.01)
*H01M 8/0438* (2016.01)
*H01M 8/04746* (2016.01)

(52) U.S. Cl.
CPC ........... *F17C 7/00* (2013.01); *H01M 8/04201* (2013.01); *H01M 8/04388* (2013.01); *H01M 8/04753* (2013.01); *F17C 2201/0109* (2013.01); *F17C 2205/0142* (2013.01); *F17C 2205/0326* (2013.01); *F17C 2250/032* (2013.01); *F17C 2250/043* (2013.01); *F17C 2250/0636* (2013.01); *F17C 2270/0184* (2013.01)

(58) Field of Classification Search
CPC ................................................. F17C 2205/0142
See application file for complete search history.

(56) References Cited

U.S. PATENT DOCUMENTS

| | | | | |
|---|---|---|---|---|
| 2018/0309146 A1* | 10/2018 | Yoshida | ............ | H01M 8/04089 |
| 2019/0157694 A1* | 5/2019 | Uchimura | .......... | H01M 8/04302 |
| 2022/0013796 A1* | 1/2022 | Igarashi | ............ | H01M 8/04686 |
| 2022/0140369 A1* | 5/2022 | Yamada | ............ | H01M 8/04201 |
| | | | | 429/444 |

FOREIGN PATENT DOCUMENTS

| | | | | |
|---|---|---|---|---|
| JP | H07-032298 U | | 6/1995 | |
| JP | 2018113154 A | * | 7/2018 | |
| JP | 2022-022900 A | | 2/2022 | |
| JP | 2022022656 A | * | 2/2022 | ........ H01M 8/04089 |
| JP | 2022-068652 A | | 5/2022 | |

* cited by examiner

*Primary Examiner* — Paul J Gray
(74) *Attorney, Agent, or Firm* — SoraIP, Inc.

(57) ABSTRACT

A gas supply module includes: a plurality of tanks; a solenoid valve; an intermediate flow path; a merging portion; a gas discharge flow path; a pressure measuring device; and a control unit. The control section controls the solenoid valve of any one of the solenoid valves to the open state at the start of the gas discharge, controls the solenoid valve to the closed state at the end of the gas discharge, and records the pressure measured by the pressure measuring device as the pressure of the tank provided with the solenoid valve controlled to the closed state.

1 Claim, 3 Drawing Sheets

GAS SUPPLY SYSTEM FOR FILLING HYDROGEN INTO TANK

CROSS-REFERENCE TO RELATED APPLICATION

This application claims priority to Japanese Patent Application No. 2022-205357 filed on Dec. 22, 2022, incorporated herein by reference in its entirety.

BACKGROUND

1. Technical Field

The present application relates to a gas supply module and a gas supply system.

2. Description of Related Art

A fuel cell is a device that generates electricity by using hydrogen and oxygen. Hydrogen used for power generation is usually stored in a hydrogen tank, and is supplied to a fuel cell at the time of power generation.

Japanese Unexamined Patent Application Publication No. 2022-68652 (JP 2022-68652 A) discloses a hydrogen supply device that supplies hydrogen gas to a fuel cell in a fuel cell system. The hydrogen supply device of JP 2022-68652 A has a plurality of hydrogen tanks, an on-off valve provided to each of the hydrogen tanks, and a control unit that controls the on-off valve. In operation of the fuel cell, the control unit selects hydrogen tanks in order from the hydrogen tanks that are not the hydrogen tank having the largest capacity, and controls the respective on-off valves so that the hydrogen gas is supplied from the selected hydrogen tanks to the fuel cell. JP 2022-68652 A describes that using such a hydrogen supply device makes it possible to prolong the life of the hydrogen supply device.

SUMMARY

In some cases, a gas supply module including a plurality of hydrogen tanks is used for filling hydrogen into a hydrogen tank provided in a fuel cell system. In such a gas supply module, the pressure in the hydrogen tank is monitored. The pressure of each hydrogen tank is measured by a pressure sensor provided in each hydrogen tank. However, if a pressure sensor is provided to each hydrogen tank, there is a problem that the configuration of the device becomes complicated.

In view of the above circumstances, it is an object of the present disclosure to provide a gas supply module and a gas supply system capable of reducing the number of pressure measuring devices.

The present disclosure provides, as one aspect for solving the above problem, a gas supply module that includes: a plurality of tanks filled with gas; a solenoid valve that is provided in each of the tanks and controls release of the gas filled in the tank; and an intermediate flow path extending toward a downstream side from each of the tanks via the solenoid valve; a merging portion connected to a plurality of the intermediate flow paths; a gas discharge flow path extending toward the downstream side from the merging portion; a pressure measuring device provided on the merging portion or on the downstream side of the merging portion; and a control unit that controls opening and closing of the solenoid valve.

The control unit controls, at a start of gas discharge, any one of the solenoid valves to be in an opened state, and, controls, at an end of the gas discharge, the solenoid valve to be in a closed state and records a pressure measured by the pressure measuring device as a pressure of the tank including the solenoid valve that is controlled to be in the closed state.

The present disclosure provides, as one aspect for solving the above problem, a gas supply system including: a plurality of the gas supply modules; a plurality of devices including a fuel cell system; and a server connected to the gas supply modules via a network.

The gas supply modules are paired with the respective devices, and the server stores device requirement information including a gas quantity and a minimum pressure required for an operation of each of the devices.

The server obtains gas supply module information including a gas quantity and a pressure of each of the tanks included in each of the gas supply modules.

The server compares the gas supply module information with the device requirement information in each of the pairs, and determines a pair having the gas supply module not satisfying a requirement of the device.

In a group of the pairs having the gas supply module not satisfying the requirement of the device, the server compares the gas supply module information of the gas supply module of one of the pairs with the device requirement information of another pair of the pairs, and searches for the gas supply module that satisfies the requirement of the device of the other pair.

According to the gas supply module of the present disclosure, the number of pressure measuring devices can be reduced. Further, according to the gas supply system of the present disclosure, the gas supply module can be operated efficiently.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Gas Supply Module

Figure 1:
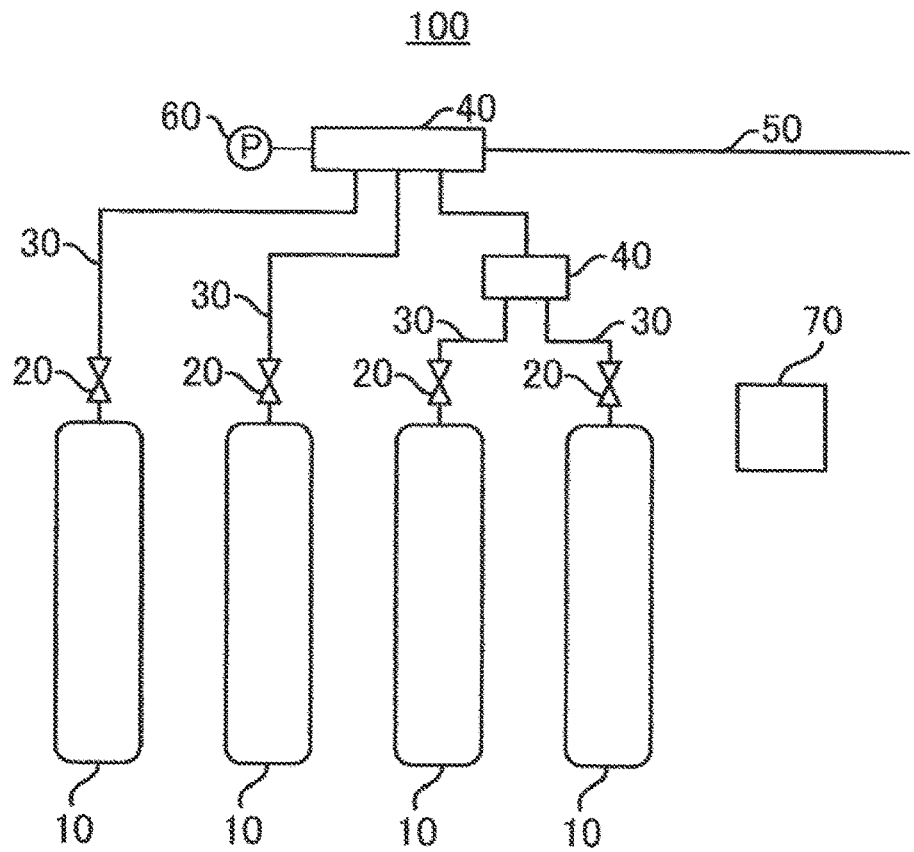
FIG. 1 is a block diagram of a gas supply module.

The gas supply module of the present disclosure will be described with reference to the gas supply module 100 which is an embodiment. FIG. 1 shows a block diagram of a gas supply module 100.

The gas supply module 100 includes a plurality of tanks 10, a solenoid valve 20 provided in each of the plurality of tanks 10, an intermediate flow path 30 extending downstream from each of the plurality of tanks 10 via the solenoid valve 20, a merging portion 40 connected to the plurality of intermediate flow paths 30, a gas discharge flow path 50 extending downstream from the merging portion 40, a pressure measuring device 60, and a control unit 70 for controlling opening and closing of the solenoid valve.

Tank 10

The tank 10 is filled with gas. The type of the gas is not particularly limited, but is, for example, a fuel gas used in a fuel cell. Examples of the fuel gas include hydrogen and a reformed gas. The capacity and the number of the tanks 10 are not particularly limited, and may be appropriately set according to the purpose.

Solenoid Valve 20

The solenoid valve 20 is provided in each of the plurality of tanks 10, and is an on-off valve that controls the release of the gas filled in the tank 10. The opening and closing of the solenoid valve 20 is performed by the control unit 70. The type of the solenoid valve 20 is not particularly limited, and examples thereof include a solenoid valve.

Intermediate Flow Path 30

The intermediate flow path 30 is a flow path extending downstream from each of the plurality of tanks 10 via the solenoid valve 20. As shown in FIG. 1, the intermediate flow path 30 connects the respective tanks 10 and the merging portion 40.

Merging Portion 40

The merging portion 40 is a member connected to the plurality of intermediate flow paths 30. The number of the merging portion 40 is not particularly limited, and may be one or two or more. If there is one merging portion 40, all intermediate flow path 30 are connected to one merging portion 40. In the case where two or more merging portions 40 are provided, at least one intermediate flow path 30 is connected to one merging portion 40, and the merging portions 40 are connected to each other. However, the number of merging portions connected to the gas discharge flow path 50 is one. FIG. 1 shows an embodiment with two merging portions 40. As shown in FIG. 1, the merging portions 40 are connected to each other, and the gas discharge flow path 50 is connected to one merging portion 40.

Gas Discharge Flow Path 50

The gas discharge flow path 50 is a flow path extending from the merging portion 40 to the downstream side. The other end of the gas discharge flow path 50 may be connected to the outside.

Pressure Measuring Device 60

The pressure measuring device 60 is a device that measures the pressure of the gas discharged from the tank 10. The pressure measuring device 60 is provided downstream of the merging portion 40 or the merging portion 40. Accordingly, the number of pressure measuring devices 60 provided in the gas supply module 100 can be reduced.

The reason for this will be described later.

Control Unit 70

The control unit 70 is a device that controls opening and closing of the solenoid valve 20. The control unit 70 is a computer such as an Electronic Control Unit (ECU).

The control unit 70 is characterized in that, at the start of gas discharge, one solenoid valve 20 of the solenoid valves 20 is controlled to be in an open state, and at the end of gas discharge, the solenoid valve 20 is controlled to be in a closed state, and the pressure measured by the pressure measuring device 60 is recorded as the pressure of the tank 10 including the solenoid valve 20 controlled to be in a closed state.

As described above, the control unit 70 controls one solenoid valve 20 of the solenoid valves 20 to be in the open state and the other solenoid valve 20 to be in the closed state at the start of gas discharge. That is, the gas supply module 100 is always controlled to release gas from one tank 10.

Therefore, when the tank 10 for discharging the gas is changed from one tank 10 to another tank 10, the solenoid valve 20 of one tank 10 is changed to the closed state, and then the solenoid valve of the other tank 10 is changed to the open state. With such control, the pressure of the merging portion 40 and the gas flowing downstream thereof becomes equal to the pressure of the tank 10 provided with the solenoid valve 20 in the open state at all times. Therefore, at the end of the gas discharge, the solenoid valve 20 is controlled to be in the closed state, and the pressure measured by the pressure measuring device 60 is recorded, whereby the pressure of the tank 10 including the solenoid valve 20 controlled to be in the closed state can be specified. As described above, the control unit 70 can always monitor the pressure of each tank 10 by controlling the gas supply module 100 as described above.

Conventionally, in a gas supply module, a technique for monitoring the pressure of each tank is known, and a pressure measuring device is provided in each tank. That is, conventionally, the number of tanks and the number of pressure measuring devices are the same. On the other hand, in the gas supply module 100, the number of the pressure measuring devices 60 can be reduced to at least one by performing the above-described control. This simplifies the device configuration and reduces the installation cost.

Figure 2:
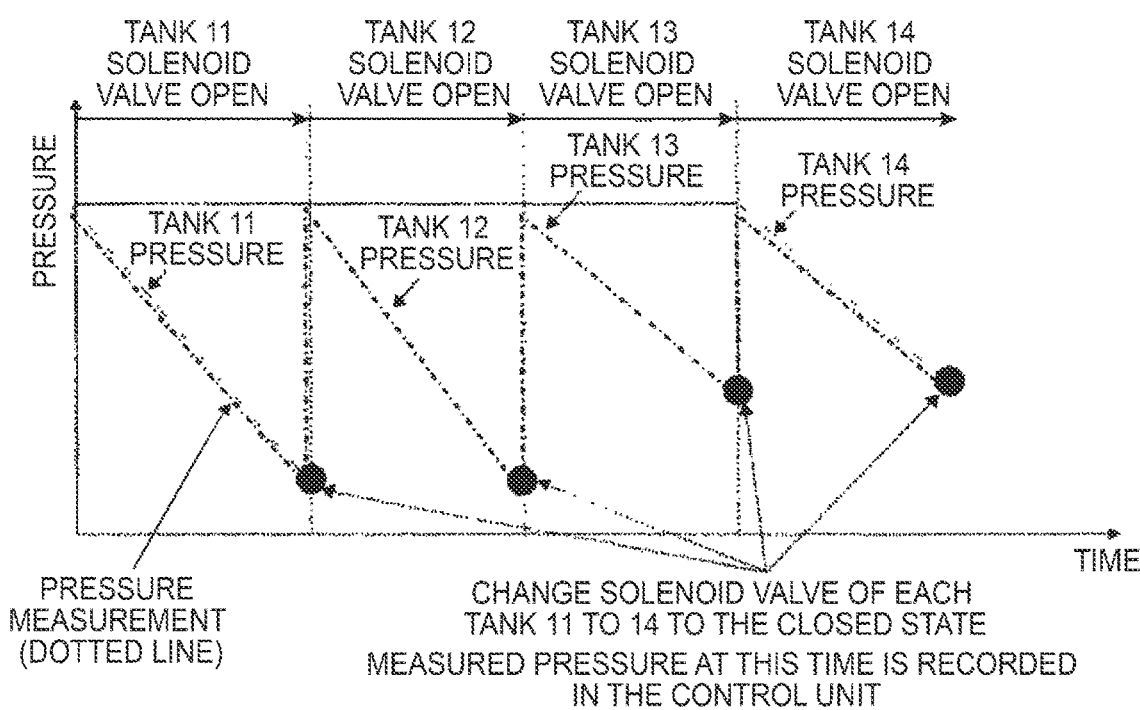
FIG. 2 is a diagram showing a change with time in the pressure of each tank 10 when four tanks 10 (tanks 11 to 14) are used in this order.

FIG. 2 shows changes with time in the pressure of each tank 10 when four tanks 10 (tanks 11 to 14) are used in this order. In FIG. 2, for the sake of clarity, the dotted line indicating the pressure measurement value and the solid line indicating the pressure of each tank 10 are described apart from each other, but these lines actually overlap each other. As shown in FIG. 2, when the solenoid valve 20 of one tank 10 is in the open state, the solenoid valve 20 of another tank 10 is controlled to be in the closed state. In the case where the four tanks 10 are used in this manner in order, the pressure measurement value when the solenoid valve 20 of each tank 10 is changed to the closed state indicates the pressure of each tank 10. Therefore, it can be seen from FIG. 2 that the gas supply module 100 can monitor the pressure of each tank 10 even if the number of pressure measuring devices 60 is reduced.

Figure 3:
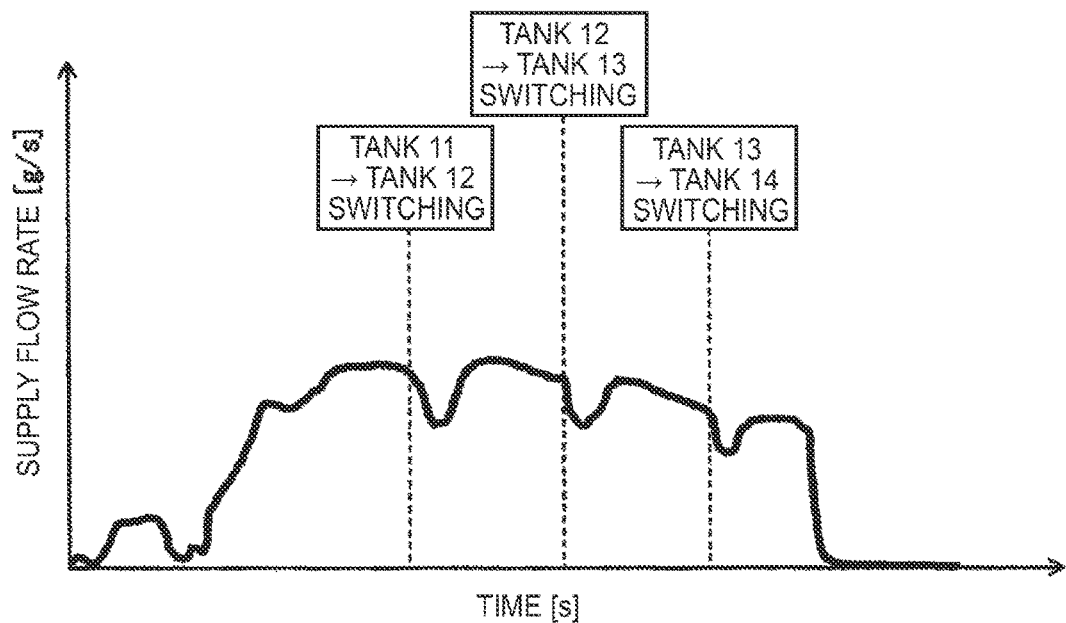
FIG. 3 is a diagram showing a change with time in flow rate when four tanks 10 (tanks 11 to 14) are used in order.

FIG. 3 shows the flow rate over time when four tanks 10 (tanks 11 to 14) are used in this order. The flow rate was measured in the gas discharge flow path 50. As shown in FIG. 3, it can be seen that the gas supply module 100 can maintain an appropriate flow rate even when the four tanks 10 are used in sequence.

Use

The gas supply module 100 may generally be used as a pressure accumulator of a simple filling device that supplies gas to a tank provided in a fuel cell system. Accordingly, the gas supply module 100 may be in a transportable form.

The gas supply module of the present disclosure has been described with reference to one embodiment. According to the gas supply module of the present disclosure, the number of pressure measuring devices can be reduced.

Gas Supply System

Figure 4:
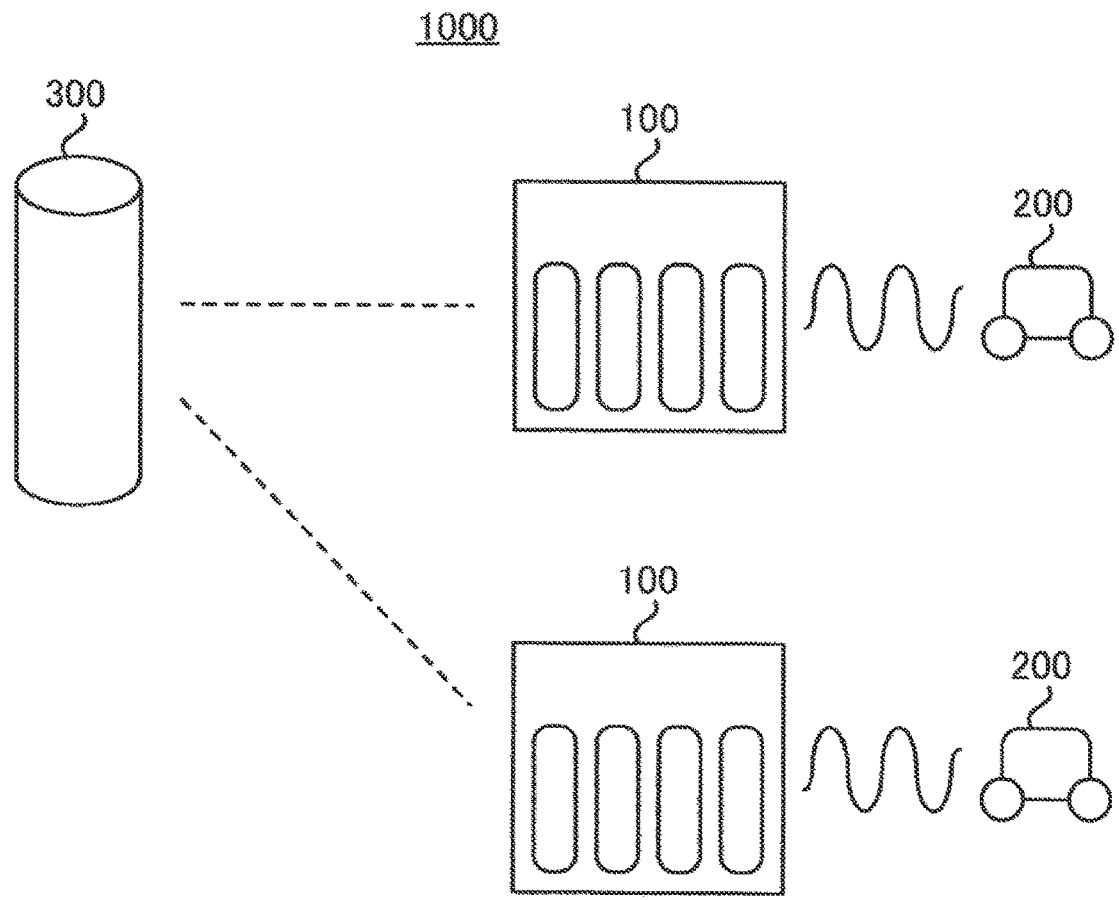
FIG. 4 is a schematic diagram of a gas supply system 1000.

The gas supply system of the present disclosure will be described with reference to the gas supply system 1000 which is an embodiment. FIG. 4 shows a schematic diagram of the gas supply system 1000.

The gas supply system 1000 includes a plurality of gas supply modules 100, a plurality of devices 200 including a fuel cell system, and a server 300 connected to the plurality of gas supply modules 100 via a network.

Gas Supply Module 100

As described above, in the gas supply module 100, the pressure of each tank 10 is monitored. Therefore, the pressure of each tank 10 provided in the gas supply module 100 is recorded by the control unit 70. Thus, the pressure of each tank 10 of the gas supply module 100 used in the gas supply system 1000 is known.

The gas supply system 1000 uses a gas supply module 100. However, the gas supply module used in the gas supply system of the present disclosure is not limited thereto. For example, a gas supply module in which the pressure of each tank is known may be used. For example, a conventional gas supply module may be used.

The conventional gas supply module is, for example, as follows. That is, the gas supply module includes: a plurality of tanks filled with gas; a solenoid valve provided in each of the plurality of tanks for controlling the discharge of the gas filled in the tanks; an intermediate flow path extending from each of the plurality of tanks to the downstream side via the solenoid valve; a merging portion connected to the plurality of intermediate flow paths; a gas discharge flow path extending from the merging portion to the downstream side; a pressure measuring device provided in each of the plurality of tanks; and a control unit for controlling the opening and closing of the solenoid valve.

Device 200

The device 200 comprises a fuel cell system. The fuel cell system includes at least a fuel cell and a fuel gas tank (hydrogen tank). Since the fuel cell system is well known in the art, a description thereof will be omitted here. The device 200 may be, for example, a fuel cell electric vehicle.

In the gas supply system 1000, one gas supply module 100 and one device 200 form a pair. By "pair" is meant the relationship that the gas supply module 100 is intended to supply gas (e.g., hydrogen) to a particular device 200.

Server 300

The server 300 is connected to the plurality of gas supply modules 100 via a network. The connection method of the network is not particularly limited. It may be a wired network or a wireless network. Also, the type of the network is not particularly limited.

Examples Include the Internet and WI-FI

The server 300 is a computer that optimizes the combination of the gas supply module 100 and the device 200. Accordingly, the server 300 has device request information including the amount of gas and the minimum pressure required for the operation of each device 200.

Optimization of the combination of the gas supply module 100 and the device 200 by the server 300 is performed as follows. (1) First, the server 300 obtains gas supply module information including the gas amount and pressure of each tank 10 included in each gas supply module 100. The amount of gas in the tank 10 can be calculated from, for example, the capacity and pressure of the tank 10. (2) Next, in each pair, the gas supply module information and the device requirement information are compared to determine a pair having a gas supply module that does not satisfy the device request. (3) Subsequently, in the set of pairs having gas supply modules that do not satisfy the requirements of the device 200, the gas supply module information of one pair of gas supply modules 100 is compared with the device requirement information of the other pair of device 200, and the gas supply module 100 that satisfies the requirements of the other pair of devices is searched. The search results may be displayed to be visible to the user.

By performing the steps (1) to (3), even if the gas supply module 100 does not satisfy the requirements of the device 200 in one pair, the other pair of device 200 to which the gas supply module 100 can be applied can be searched. Then, the user can efficiently operate the gas supply module 100 by appropriately replacing the gas supply module 100 based on the search result.

Figure 5:
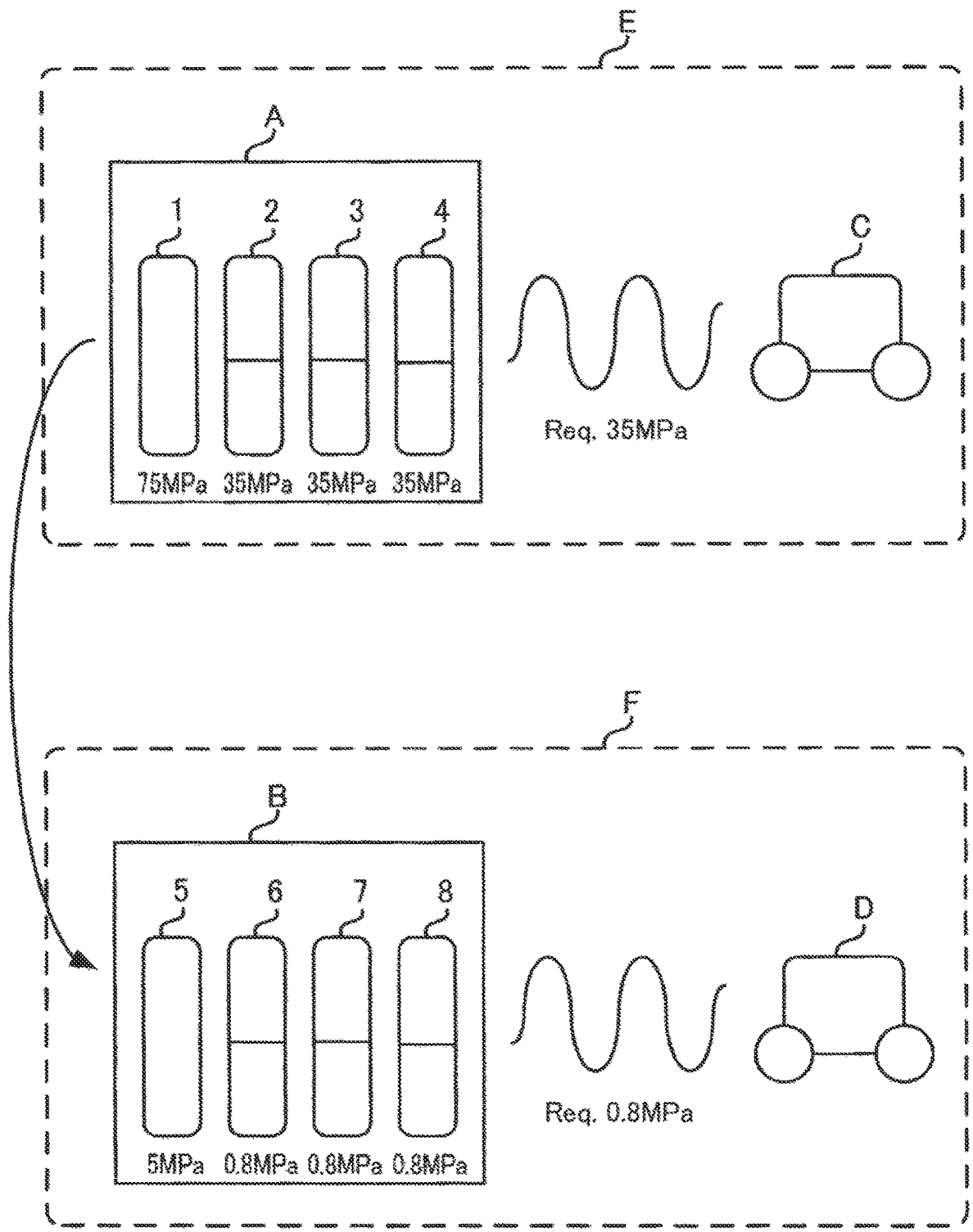
FIG. 5 is a schematic diagram illustrating an embodiment of a gas supply system 1000.

FIG. 5 shows a specific example of the gas supply system 1000. FIG. 5 shows an example in which the gas supply modules A and B of the two pairs E and F and the devices C and D are used.

First, the pair E formed from the gas supply module A and the device C will be described. As shown in FIG. 5, the gas supply module A is in use, and the pressures of the respective tanks 1 to 4 are 70 MPa, 35 MPa, 35 MPa, 35 MPa. Here, the minimum pressure required for the operation of the device C is 35 MPa. Thus, the tank 1 meets this requirement. However, the amount of gas required for the operation of the device C is not satisfied only by the tank 1. Accordingly, the server determines that the pair E is a pair having the gas supply module A that does not satisfy the requirements of the device C.

Next, a pair F formed from the gas supply module B and the device D will be described. As shown in FIG. 5, the gas supply module B is in use and the pressure of the respective tanks 5 to 8 is 5 MPa, 0.8 MPa, 0.8 MPa, 0.8 MPa. Here, the minimum pressure required for the operation of the device D is 0.8 MPa. Thus, the tank 5 meets this requirement. However, the amount of gas required for the operation of the device D is not satisfied only by the tank 5. Accordingly, the server determines that the pair F is a pair having the gas supply module B that does not satisfy the requirements of the device D.

Next, the server compares the gas supply module information of the gas supply module A of the pair E and the device requirement information of the device D of the other pair F in the set of pairs E and F. Then, the gas supply module A of the pair E satisfies the requirements of the device D of the other pair F. Thus, the server can provide the user with this search result. The user can replace the gas supply module B with the gas supply module A based on the search result. Therefore, the gas supply module can be operated efficiently.

The gas supply system of the present disclosure has been described with reference to one embodiment. According to the gas supply system of the present disclosure, the gas supply module can be operated efficiently.

What is claimed is:

1. A gas supply system comprising:
a plurality of gas supply modules, each gas supply module of the plurality of gas supply modules including:
 a plurality of tanks filled with gas;
 a plurality of solenoid valves, each solenoid valve of the plurality of solenoid valves being provided on a corresponding tank of the plurality of tanks, and the plurality of solenoid valves being configured to control release of the gas from the plurality of tanks;
 a plurality of intermediate flow paths, each intermediate flow path of the plurality of intermediate flow paths extending downstream from the corresponding tank via a corresponding solenoid valve of the plurality of solenoid valves;
 a merging portion connected to the plurality of intermediate flow paths;
 a gas discharge flow path extending downstream from the merging portion;

a sensor provided on the merging portion or downstream of the merging portion; and
a processor configured to:
   control opening and closing of the plurality of solenoid valves,
   control, at a start of gas discharge, a first solenoid valve of the plurality of solenoid valves to be opened, the first solenoid valve being provided in a first tank of the plurality of tanks,
   control, at an end of the gas discharge, the first solenoid valve to be closed,
   control the sensor to measure a pressure of the first tank, and
   store the measured pressure of the first tank;
a plurality of devices including a fuel cell system; and
a server connected to the plurality of gas supply modules via a network, wherein;
the plurality of gas supply modules are paired with the plurality of devices respectively, and
the server is configured to:
   store device requirement information, the device requirement information including a gas quantity and a minimum pressure required for an operation of each device of the plurality of devices,
   obtain gas supply module information, the gas supply module information including a gas quantity and a pressure of each tank of the plurality of tanks included in each gas supply module of the plurality of gas supply modules,
   compare the gas supply module information with the device requirement information in each pair of the gas supply module and the device,
   identify a plurality of pairs in which the gas supply module does not satisfy a requirement of the device paired with the gas supply module,
   compare the gas supply module information of one pair of the plurality of pairs with the device requirement information of another pair of the plurality of pairs, and
   identify, from the plurality of pairs, a first gas supply module that satisfies the requirement of a device of the other pair.

* * * * *